United States Patent [19]

Nakajima et al.

[11] 4,445,150

[45] Apr. 24, 1984

[54] RECORDING IN A SINGLE TRACK VISUAL SIGNALS ASSOCIATED WITH AUDIO SIGNALS RECORDED IN OPPOSED DIRECTIONS IN PLURAL TRACKS

[75] Inventors: Heitaro Nakajima; Kenkichi Umeda, both of Tokyo; Youichi Kodera, Yokohama; Noriaki Naito, Tokyo; Hiroyuki Yamauchi, Sagamihara; Isao Matsumoto, Fujisawa; Shouichi Nakamura, Tokyo; Katsuo Takada, Yokohama; Ken Shiga, Tokyo; Yoshihito Yamamoto, Yokohama, all of Japan

[73] Assignee: Sony Corporation, Tokyo, Japan

[21] Appl. No.: 322,367

[22] Filed: Nov. 17, 1981

[30] Foreign Application Priority Data

Nov. 18, 1980 [JP] Japan .................................. 55-162513

[51] Int. Cl.$^3$ .......................... G11B 15/02; G11B 5/43
[52] U.S. Cl. ......................................... 360/18; 360/22; 360/27
[58] Field of Search ...................... 360/22, 18, 27, 32, 360/55, 49, 72.2; 369/47, 48

[56] References Cited

U.S. PATENT DOCUMENTS 4,121,264 10/1978 Kishi et al. ............................ 360/27

FOREIGN PATENT DOCUMENTS 1146410 3/1969 United Kingdom ............... 360/33.1

*Primary Examiner*—Vincent P. Canney
*Attorney, Agent, or Firm*—Lewis H. Eslinger; Alvin Sinderbrand

[57] ABSTRACT

A method of recording and reproducing audio signals and corresponding visual signals in parallel tracks extending in the longitudinal direction on a magnetic tape, includes the steps of recording the audio signals in first and second primary tracks on opposite sides of the tape in the widthwise direction thereof; and alternately recording a first visual information signal corresponding to the audio signal in the first primary tracks and a second visual information signal corresponding to the audio signal in the second primary tracks in a single secondary track positioned in the center of the tape in the widthwise direction thereof, the first visual information signal being recorded in first information blocks in the secondary track and the second visual information signal being recorded in second information blocks in the secondary track in an alternating relation with the first information blocks such that only the first visual information signal is reproduced when reproducing the audio signal from the first primary tracks and only the second visual information signal is reproduced when reproducing the audio signal from the second primary tracks. The preset invention is also directed to apparatus for performing the above method.

8 Claims, 35 Drawing Figures

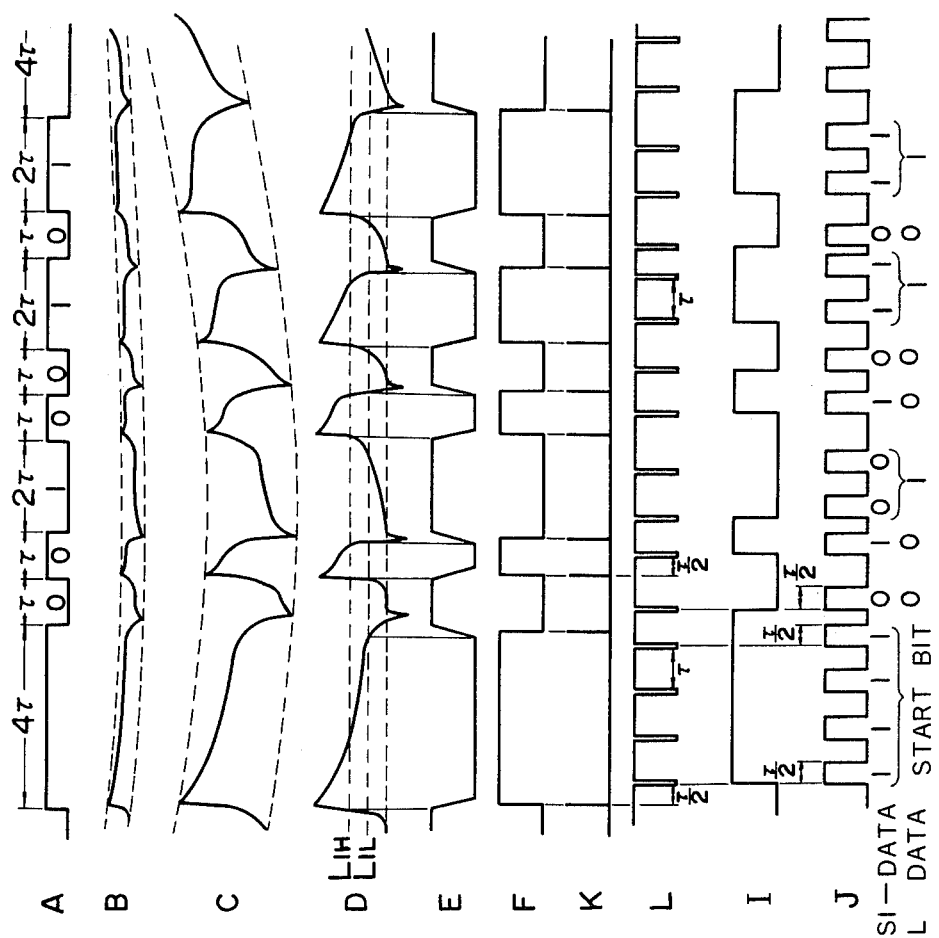

RECORDING IN A SINGLE TRACK VISUAL SIGNALS ASSOCIATED WITH AUDIO SIGNALS RECORDED IN OPPOSED DIRECTIONS IN PLURAL TRACKS

BACKGROUND OF THE INVENTION

1. Field of the Invention

This invention relates generally to a method and apparatus for recording and reproducing information signals and, more particularly, is directed to a method and apparatus for recording and reproducing audio signals and visual information signals corresponding to the audio signals.

2. Description of the Prior Art

Audio tape recording and reproducing apparatus, such as compact cassette tape recorders, generally only record and reproduce audio signals, for example, music, dialogue or the like. It is often desired, however, to record visual information on the magnetic tape along with the audio information. For example, it may be desirable to visually reproduce sheet music or the vocal arrangement for a musical arrangement or song which has been reproduced from a magnetic tape. As a further example, it may be desirable to visually reproduce teaching text while listening to audiolingual educational material reproduced in a language laboratory, or to visually reproduce a meeting memorandum corresponding to the audio reproduction of a recorded meeting. Such visual information can be reproduced on a display which forms part of, or is an accessory to, the tape recording and reproducing apparatus.

It should be appreciated that, for the sake of simplicity, the secondary visual information signal should be recorded on the magnetic tape in close proximity to the primary audio signal to which it corresponds. In one known apparatus, described in detail in U.S. Pat. No. 4,121,264, issued on Oct. 17, 1978 and having a common assignee herewith, primary information signals are recorded in first and second main or primary signal tracks and secondary signals corresponding to the primary information signals are recorded in first and second secondary tracks extending in the longitudinal direction of the tape in the center thereof between the first and second main signal tracks. In this patent, the secondary signals are control signals, such as pulses to control the operation of playback mechanisms. Due to the fact that such secondary signals contain relatively little information, they do not require as much tape width as the main signals recorded simultaneously therewith.

Generally, however, the magnetic tape housed in a compact audio cassette has a relatively narrow width. Accordingly, with cassette tape, it becomes extremely difficult to provide first and second secondary or control tracks in the center of the tape in accordance with the aforementioned patent. Further, it is to be appreciated that visual information may require more complex secondary signals than the control pulses used in U.S. Pat. No. 4,121,264, therefore requiring the use of a greater amount of tape.

OBJECTS AND SUMMARY OF THE INVENTION

Accordingly, it is a principal object of this invention to provide a method of and apparatus for recording primary information signals and secondary information signals related thereto which overcome the aforementioned difficulties encountered in the prior art.

More particularly, it is an object of this invention to provide a method of and apparatus for recording primary information signals and secondary information signals related thereto on a magnetic tape, in which the secondary information signals are recorded in a single secondary track extending in the longitudinal direction and at the center of the tape.

It is another object of this invention to provide a method of and apparatus for recording primary information signals and secondary information signals related thereto on a magnetic tape so as to minimize any cross-talk interference between the primary information signals and the secondary information signals.

It is still another object of this invention to provide a method of and apparatus for recording audio signals in first and second primary signal tracks on a magnetic tape and recording visual information signals related to the audio signals in a single track at the center of the tape.

In accordance with an aspect of this invention, a method is provided for recording a plurality of primary signals and a corresponding plurality of secondary signals in parallel tracks on a record medium, the method comprising the steps of recording a first primary signal in at least one first primary track; recording a second primary signal in at least one second primary track; and alternately recording a first secondary signal corresponding to the first primary signal and a second secondary signal corresponding to the second primary signal in a single secondary track positioned between at least one first primary track and at least one second primary track.

In accordance with another aspect of this invention, apparatus is provided for recording a plurality of primary signals and a corresponding plurality of secondary signals in parallel tracks on a record medium, the apparatus comprising means for recording a first primary signal in at least one first primary track; means for recording a second primary signal in at least one second primary track; and means for alternately recording a first secondary signal corresponding to the first primary signal and a second secondary signal corresponding to the second primary signal in a single secondary track positioned between at least one first primary track and at least one second primary track.

The above, and other, objects, features and advantages of the present invention will be apparent from the following detailed description of illustrative embodiments of the invention which is to be read in connection with the accompanying drawings.

BRIEF DESCRIPTION OF THE DRAWINGS

FIG. 15A–15F, 15I and 15J are expanded waveform diagrams of portions of the waveforms of FIGS. 14A–14F, 14I and 14J, respectively, and FIGS. 15K and 15L are waveform diagrams used for further explaining the operation of the circuit of FIGS. 12 and 13.

DETAILED DESCRIPTION OF THE PREFERRED EMBODIMENTS

Figure 1:
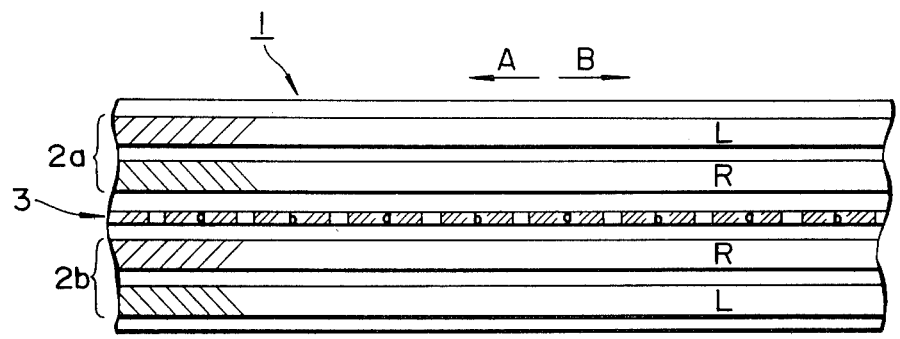
FIG. 1 is a schematic plan view of a short length of magnetic tape having first primary tracks, second primary tracks and a single secondary track recorded thereon in accordance with one embodiment of this invention.

Referring to the drawings in detail, and initially to FIG. 1 thereof, there is shown a schematic plan view of a short length of magnetic tape from a conventional audio cassette having information signal tracks recorded thereon in accordance with the method and apparatus according to one embodiment of this invention. In particular, first and second primary or main audio signal tracks 2a and 2b are recorded on magnetic tape 1 in the longitudinal tape running direction thereof. Tracks 2a and 2b are parallel to each other and are arranged symmetrically on opposite sides of the center of the tape in the widthwise direction thereof. As shown in FIG. 1, each of the first and second primary signal tracks 2a and 2b is comprised of a separate left (L) and right (R) channel track for the recording and reproducing of stereo audio signals and which channel tracks are separated by signal-free guard bands. Alternately, the two separate channel tracks of each of the primary signal tracks 2a and 2b may constitute a teacher's channel track and a student's channel track with respect to audiolingual educational material. Still further, each of the first and second primary signal tracks 2a and 2b may be constituted by a single track, for example, as shown in the aforementioned commmonly assigned U.S. Pat. No. 4,121,264, the disclosure of which is incorporated herein by reference.

Figure 2:
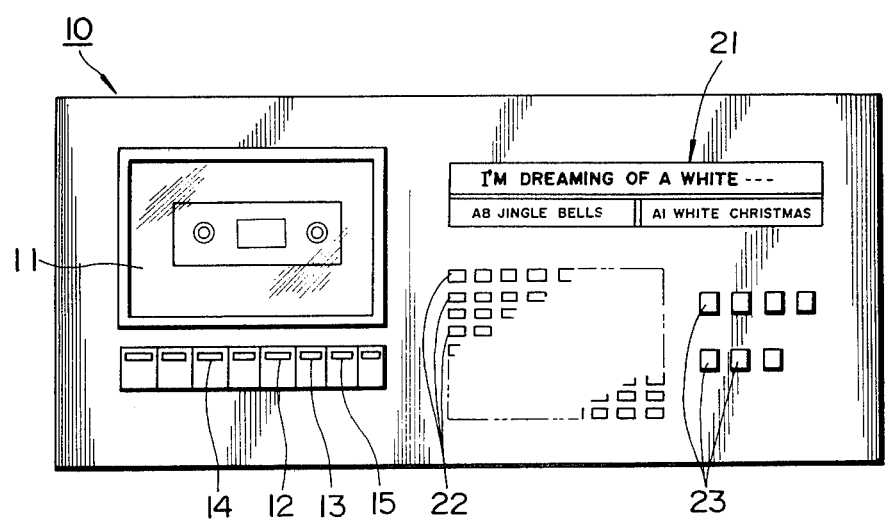
FIG. 2 is an elevational view of a control panel for a tape recording and reproducing apparatus according to one embodiment of this invention.

Generally, when the cassette containing magnetic tape 1 is inserted in a tape recording and reproducing apparatus, as shown in FIG. 2, the magnetic tape is transported in the direction of arrow A of FIG. 1. Thus, for example, the tracks 2a have first primary audio signals recorded therein when the magnetic tape is transported in the direction of arrow A. The position of the cassette in apparatus 10 is inverted of flipped over to record the second primary audio signals in tracks 2b. In other words, the positions of tracks 2a and tracks 2b are interchanged from the position shown in FIG. 1 when it is desired to record on and reproduce from the latter tracks. In such case, however, although the second primary audio signals are recorded on and reproduced from tracks 2b when the magnetic tape is actually moving in the direction of arrow A of FIG. 1, the effective direction of movement of magnetic tape 1, as indicated by arrow B of FIG. 1, is opposite to the direction of movement of the tape when recording on and reproducing audio signals from tracks 2a. For the sake of simplicity, the direction of arrow B will hereinafter be referred to as the direction of transportation of the tape when recording on and reproducing audio signals from tracks 2b. In other words, the first and second primary signal tracks 2a and 2b correspond to respective A (first) and B (second) sides of the cassette.

As shown in FIG. 1, a secondary signal track 3 having a smaller width than either of the separate channel tracks of primary signal tracks 2a and 2b is recorded on magnetic tape 1. Secondary signal track 3 is positioned centrally between primary signal tracks 2a and 2b and is separated from each by a signal-free guard band. Secondary signal track 3 is parallel to such latter tracks, thereby also extending in the longitudinal tape running direction of magnetic tape 1. The information recorded in secondary signal track 3 is related to or corresponds to the audio signals recorded in primary signal tracks 2a and 2b. The information recorded in secondary signal track 3 is preferably in digital form and is recorded in individual information blocks each containing a discrete quantity of information, as will be discussed in more detail hereinafter. Thus, the secondary signal is comprised of first information blocks a corresponding to first primary signal tracks 2a and second information blocks b corresponding to second primary signal tracks 2b. It should be apparent that the first and second information blocks a and b in FIG. 1 are alternately arranged, that is, on a time division basis, in the longitudinal running direction of the tape. Further, as will be more apparent hereinafter, first information blocks a are recorded on magnetic tape 1 while the latter is effectively moving in the direction of arrow A, while second information blocks b are recorded on magnetic tape 1 while the latter is effectively moving in the direction of arrow B, in accordance with the recording and reproducing of audio signals with respect to primary signal tracks 2a and 2b, respectively.

It is to be appreciated that the secondary information signals recorded in secondary signal track 3 will vary in accordance with the audio signals recorded in first and second primary signals tracks 2a and 2b. For example, where the audio signals are for recorded music, the information recorded in secondary signal track 3 may correspond to the vocal arrangement, that is, the text of the songs for accompanying the music, the name of each song and the amount of time remaining in the song, recorded at a position corresponding to the music recorded in primary signal tracks 2a and 2b, and a list of the names of all of the musical arrangements or songs recorded in the primary signal tracks. For audiolingual educational material, the information recorded in secondary signal track 3 may relate to words, sentences or a grammatical commentary corresponding to the pronunciation and grammatical use of words when the audio signal is reproduced from the primary signal tracks. For audio educational material, not of the audiolingual type, signals corresponding to text sentences may be recorded in secondary signal track 3, while corresponding commentary on such sentences may be recorded in the primary signal tracks. In any event, secondary signal track 3, in all of the above uses, includes visual information. As another example, the secondary signal track may be used for storing a summary or opinion of a meeting or speech recorded in the primary signal tracks. It is also possible to record address information in secondary signal track 3 corresponding to the information recorded in primary signal tracks 2a and 2b. In this manner, the contents of the primary signal tracks can be easily searched. Preferably, the contents of the visual or address information recorded in secondary signal tracks 3, which may include, when reproduced, numerical figures, characters, symbols and simple drawings (hereinafter referred to collectively as characters) is digitally recorded. In this manner, if the characters are digitally coded by several bits or several tens of bits, the information recorded in secondary signal tracks 3 may be condensed compared to video information in, for example, a conventional video tape recording apparatus.

Referring now to FIG. 2, there is shown a control panel for a tape recording and reproducing apparatus 10 according to one embodiment of this invention for recording and reproducing information signals with respect to the track pattern shown in FIG. 1. In particular, the control panel includes a cassette holding section 11 within which the cassette is adapted to be held for recording and reproducing therefrom. The control panel also includes a plurality of mode selection buttons, such as a playback button 12, a fast-forward button 13, a rewind button 14 and a recording button 15. A display section 21 is provided in the upper right-hand corner of the control panel for displaying the visual information recorded in secondary signal track 3 and may be constituted by a dot matrix display, for example, using liquid crystal or light-emitting diodes. In this manner, the luminescent dots which form the matrix are operated in an ON or OFF condition so as to display the visual characters corresponding to the information recorded in secondary signal track 3. In the embodiment of FIG. 2, the display section is comprised of an elongated horizontally extending display area adapted to display at least ten characters and includes an upper row and a lower row, with the lower row being divided into two sections. The upper row may be used to display song texts, that is, the words of a song which accompany a musical arrangement then being reproduced. The first section of the lower row may be used, for example, to display a list of the musical arrangements or songs recorded on one side of the tape one at a time, while the second section may be used to display the name of the musical arrangement or song being reproduced. Preferably, the character "A" or "B" for indicating the A (first) or B (second) side of the cassette then being reproduced is displayed in the heading portions of both of the first and second sections of the lower row, a numeral representing the number of a musical arrangement or song on that side of the cassette is displayed in the heading portion of the first section of the lower row, and a numeral representing the first, second, third and so on musical arrangement or song that is then being played is displayed in the heading portion of the second section of the lower row. For example, as shown in FIG. 2, the character "A" in both sections of the lower row indicates that the A side of the cassette is being reproduced, the numeral 8 in the heading portion of the first section of the lower row indicates, for example, the eighth musical selection of a plurality of selections recorded on the A side, and the numeral 1 in the heading portion of the second section of the lower row indicates the first selection of the plurality of selections which is then being reproduced.

A plurality of input buttons 22 for recording information on secondary signal track 3 are provided on the control panel of tape recording and reproducing apparatus 10. The faces or exposed surface portions of buttons 22 have numerals 0 to 9, English alphabet letters A to Z, Japanese katakana letters, simple drawings thereon and any other desirable characters. Generally, a plurality of characters are assigned to a single button and a selection key or the like is provided for determining which of the characters is to be operative. Other input control keys, such as a clear key and a return key, are also generally provided. Control panel 10 further includes function keys 23 for effecting a sequence of operations in connection with the display, editing, searching, and the like of information recorded on magnetic tape 1.

Figure 3:
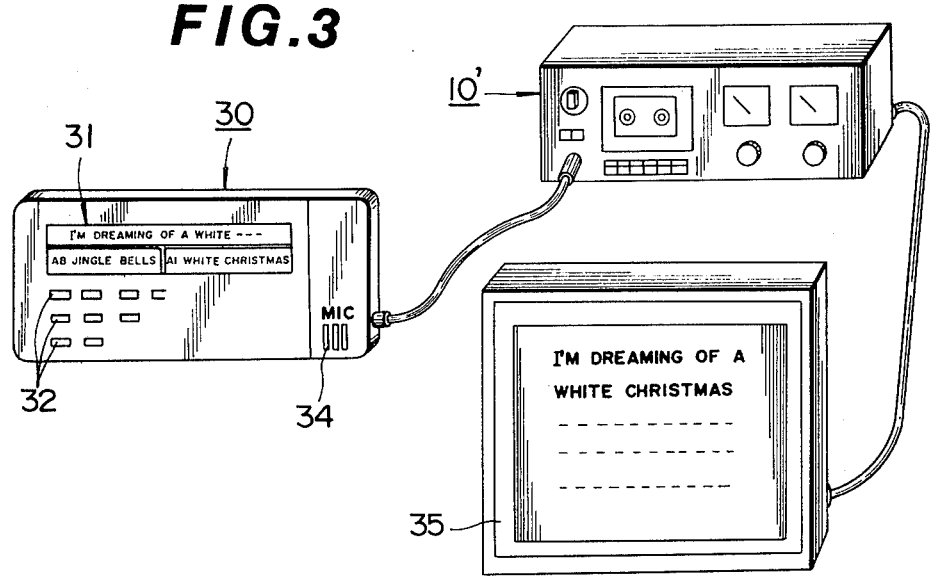
FIG. 3 is a perspective view of a tape recording and reproducing apparatus according to another embodiment of this invention.
Figure 4:
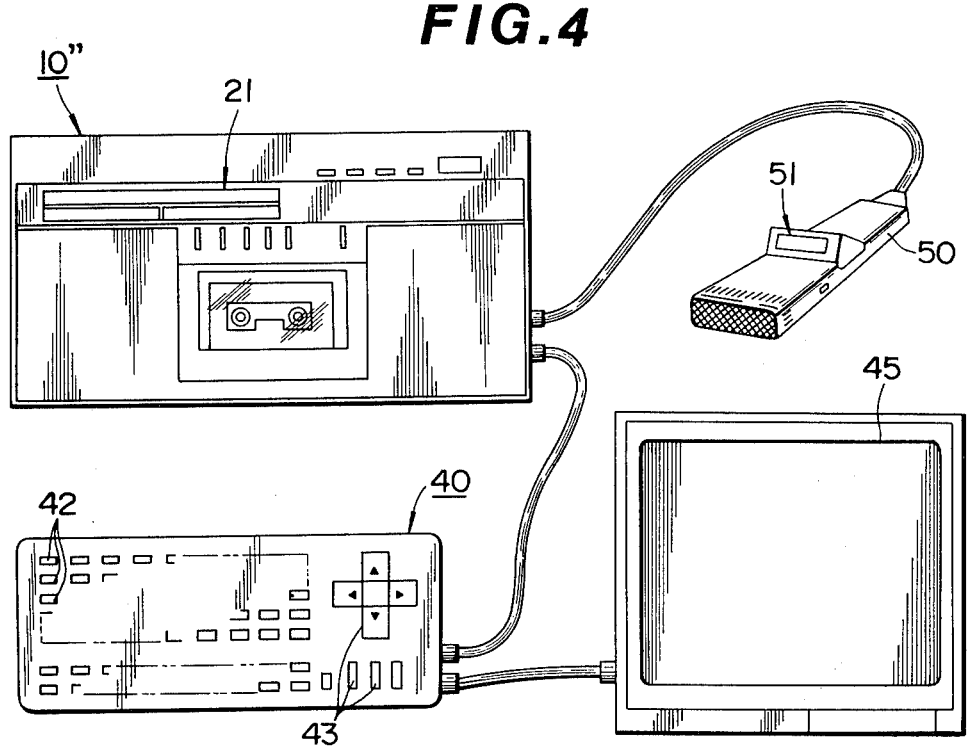
FIG. 4 is a perspective view of a tape recording and reproducing apparatus according to another embodiment of this invention.

It should be appreciated that while display section 21 and input buttons 22 are provided directly on the control panel of tape recording and reproducing apparatus 10 of FIG. 2, a separate display input device 30 which can control the recording and reproducing of all signals, as shown in FIG. 3, may be provided with a tape recording and reproducing apparatus 10'. In this regard, display input device 30 is connected to apparatus 10' and includes a microphone 34, and a display section 31 and input buttons 32 substantially identical to display section 21 and input buttons 22 of the apparatus of FIG. 2. It is also possible to provide a separate display section, such as a conventional television receiver or monitor receiver 35 or a separate dot matrix display connected to tape recording and reproducing apparatus 10', in addition to or in place of display section 31. Alternatively, as shown in FIG. 4, a portable cassette tape recording and reproducing apparatus 10 may be provided with display section 21 and may optionally be connected to and used with a separate input device 40 having input buttons 42 and function keys 43, a separate microphone 50 having its own display section 51, and a separate monitor receiver 45 or the like. Further, although each tape recording and reproducing apparatus in FIGS. 2, 3 and 4 appears to be of a conventional type, it is to be appreciated that each apparatus includes an internal magnetic head and associated circuitry for recording and reproducing from the secondary signal track 3.

Figure 5A:
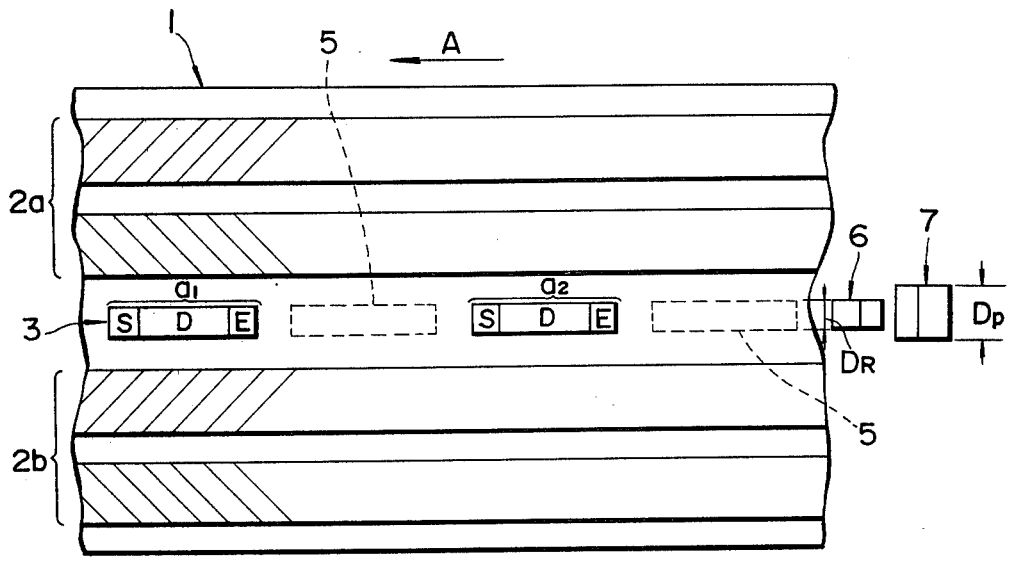
FIGS. 5A and 5B are enlarged schematic plan views of a portion of the magnetic tape of FIG. 1, used for illustrating the formation of information blocks in the single secondary signal track.
Figure 5B:
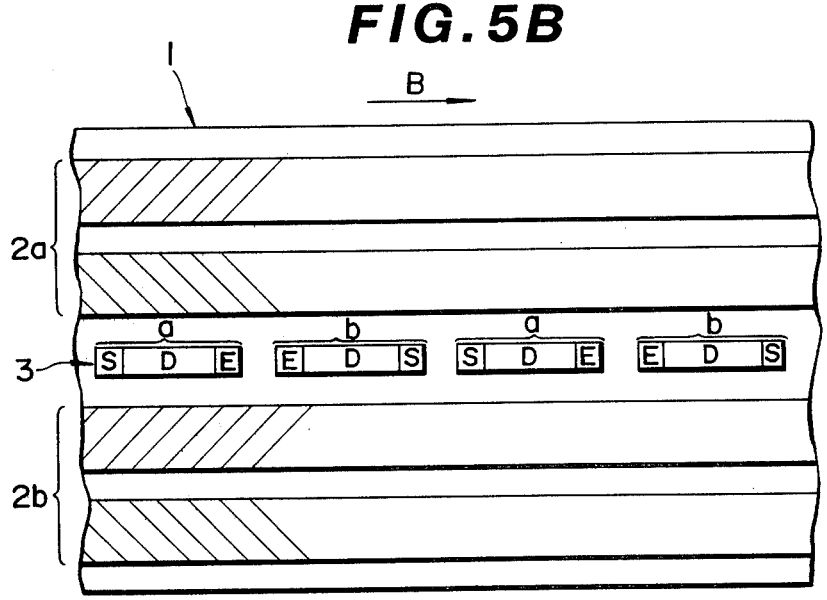
Figure 11:
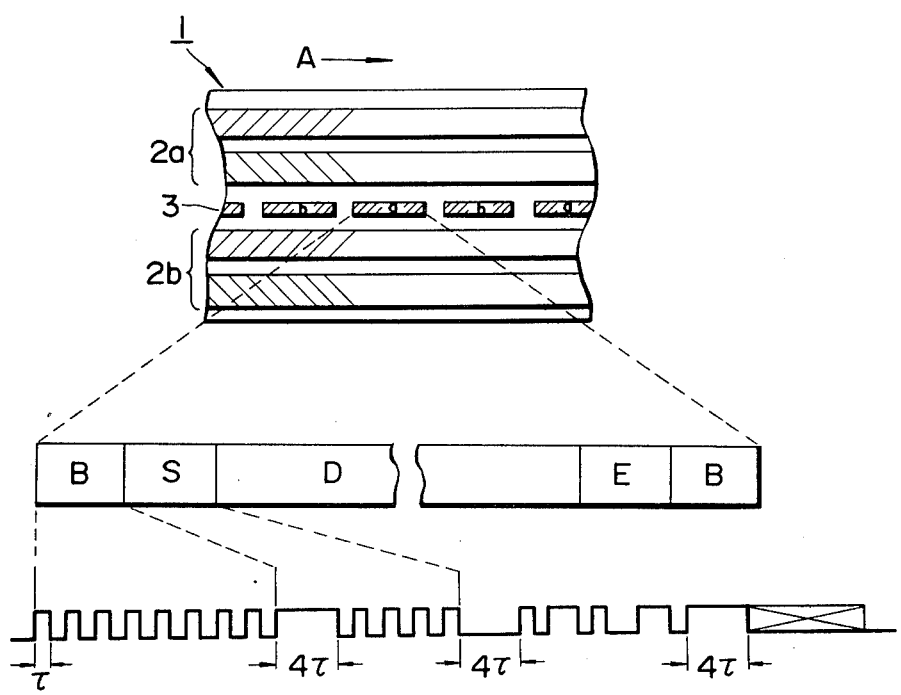
FIG. 11 is a schematic plan view of a short length of magnetic tape, and illustrating the data format in one block of the secondary information signal recorded in the single secondary signal track.

Referring now to FIGS. 5A, 5B and 11, a detailed description of the recording format of each information block in secondary signal track 3 will now be discussed. In particular, each information block a and b in secondary signal track 3 is formed principally with a start signal S, a data signal D and an end signal E. It is to be appreciated that the start signal S is always provided at the leading end position of each block in the tape running direction. Thus, when magnetic tape 1 is effectively transported in the direction of arrow A in FIG. 5A so as to record the audio signals in primary signal tracks 2a, start signal S is provided to the left of each information block a, as shown in FIG. 5A, while the end signal E is recorded at the trailing end of each block a. On the other hand, since second information blocks b are recorded when magnetic tape 1 is effectively moving in the direction of arrow B of FIG. 5B, that is, when audio signals are recorded in primary signal tracks 2b, the positions between the start and end signals S and E are reversed from the respective positions in first information blocks a.

During the recording operation, first primary signal tracks 2a are first recorded on magnetic tape 1 so that only first information blocks a are recorded in secondary signal track 3. Since first and second information blocks a and b are alternately recorded in secondary signal track 3, sufficient space must be provided between adjacent first information blocks a in order to later record second information blocks b therebetween. Accordingly, a blank or empty portion 5 having a length at least equal to that of an information block b is provided between adjacent first information blocks a. In other words, a signal-free length of tape in secondary signal track 3 is provided between the completed recording of end signal E in information block $a_1$ and the beginning of start signal S in the next information block $a_2$, as shown in FIG. 5A. Rather than detecting the trailing end of end signal E in information block $a_1$ and the beginning of start signal S in information block $a_2$, a constant interval from the start signal S of block $a_1$ and the start signal S of the next information block $a_2$ may be provided. For example, if each block includes information corresponding to approximately 0.2 seconds of tape transport time, the length of each information block a in secondary signal track 3 during normal recording speed is approximately 10 mm. If the period between start signals S of adjacent information blocks a is set for approximately 0.6 seconds of tape transport time (a length of 30 mm), the length from the end signal E of block $a_1$ until the start signal S of block $a_2$ is approximately 20 mm which corresponds to approximately 0.4 seconds of tape transport time.

After recording first information blocks with a blank portion 5 between adjacent blocks a, the cassette is turned over so that the tape is effectively transported in the direction of arrow B in FIG. 5B. In other words, at such time, the audio signals are recorded in second primary signal tracks 2b. During such recording operation, second information blocks b are recorded in block portions 5 between adjacent first information blocks a. With the above arrangement of first information blocks a, the recording of each second information block b may start a predetermined time after the start signal S of a first information block a has been completely reproduced. For example, an information block b may be recorded after the lapse of 0.1 seconds upon the completion of the reproduction or detection of an information block a. In this manner, since each information block a and b corresponds to approximately 0.2 seconds of tape transport time, the interval between adjacent blocks a and b is set to a length of approximately 5 mm corresponding to approximately 0.1 seconds of tape transport time, and information blocks a and b are alternately recorded in secondary signal track 3. With the above arrangement, the magnetic head assembly repeats alternate operations of reproducing a block a and recording a block b. However, the reproducing of each block a at such time is only used for determining the correct position at which each block b is to be recorded.

It is to be appreciated that the alternately recorded information blocks a and b are recorded in opposite directions in secondary signal track 3. In other words, when magnetic tape 1 is being transported in the effective direction of arrow A in FIG. 5A, the signal in information blocks a is normally reproduced in the order of the start signal S, data signal D and end signal E, while the end signals E in second information blocks b are reproduced first and the start signals S are reproduced last. In this manner, information in second information blocks b is prevented from being reproduced as part of the visual information signal.

The signal recording format for one information block a or b will now be described with reference to FIG. 11. As previously discussed, each information block includes a start signal S, a data signal D and an end signal E. The data signal D contains visual information corresponding to the audio signal recorded in the primary signal tracks and start signal S and end signal E contain information for determining whether the information block is a first information block a or a second information block b. As previously discussed, the signals recorded in secondary signal track 3 are preferably digital signals. Accordingly, when the digital signal is recorded with a high recording density, it is not practical to include a clock signal having a constant frequency and a constant phase in each data signal D. Accordingly, as shown in FIG. 11, a burst signal B is provided at the leading and trailing ends of each block, that is, adjacent the respective start signal S and end signal E. The burst signal B is used as a clock signal, and also for an automatic gain control (AGC) function, to be described hereinafter, by controlling the data signal D so that the output level thereof has a constant value during playback. In this manner, each block is constituted sequentially by a burst signal B, a start signal S, a data signal D, an end signal E and a burst signal B, arranged in the direction of relative movement of the magnetic tape with respect to the head assembly.

As previously discussed, the start signal S and end signal E of each information block is used for determining whether the information block is a first information block a or a second information block b. Therefore, in accordance with the present invention, it is desirable that the start signal S and end signal E be capable of being read in either of the effective directions A or B of movement of magnetic tape 1. Since the signals recorded in secondary signal track 3 are digital signals, each start signal S and end signal E may be comprised of eight bits which are the same when read in the forward direction or the reverse direction of movement of the tape. Example of such digital codes for start signal S and end signal E are shown below in Table 1, although it is to be appreciated that any other codes which are identical when read in the forward or reverse directions may be utilized.

TABLE 1

|         | Start signal S |      | End signal E |      |
|---------|----------------|------|--------------|------|
| Block a | 0000           | 0000 | 1100         | 0011 |
| Block b | 1111           | 1111 | 0011         | 1100 |

In a preferred embodiment of this invention, data signal D in each information block, which is comprised of characters related to the audio signal, is digitally encoded into eight bits (one byte). It is to be appreciated, however, that cross-talk interference may occur between the audio signals recorded in the primary signal tracks 2a and 2b and the secondary visual signals recorded in secondary signal track 3. Such cross talk interference can be substantially suppressed by increasing the recording frequency of the secondary signals recorded in secondary signal track 3 and reducing the recording level thereof. Generally, the level of cross-talk interference between adjacent tracks increases with increases in the frequency of the signals and also at frequencies less than 100 Hz. Since the audio signals recorded in primary signal tracks 2a and 2b are analog signals with frequencies ranging between 20 Hz and 20 KHz, the secondary signals are selected to have frequencies between 1 KHz and 4 KHz. In this manner, the apparent signal level of the secondary signals is improved by limiting the frequency spectrum of such signals to the aforementioned range with the recording level thereof reduced, and by emphasizing the reproduced secondary signals when detecting that the level thereof is increased in the limited frequency range.

Accordingly, the eight-bit digital data signal D in each information block a or b may be subjected to various modulation recording techniques for limiting the frequency of the secondary signal within the aforementioned frequency range. For example, one modulation system that may be utilized is a phase encoding (PE) or frequency modulation (FM) system. With such a system, a pulse width or interval of $\tau$ is detected as representing a logic level "0" bit, while a pulse width or interval equal to $2\tau$ is detected as representing a logic level "1" bit, where $\tau$ is a reference period. Unlike conventional FM modulation in which a period longer than one cycle period of the waveform corresponds to a logic level "0" bit or a logic level "1" bit, two bits of information are included in each cycle period ($2\tau$ or $4\tau$) of the waveform by setting the interval from the rising (or falling) of a pulse until the next falling (or rising) to $\tau$ or $2\tau$. In this manner, a vast improvement in the recording density is obtained. In addition, each data signal D includes a start bit which has a pulse width other than $\tau$ or $2\tau$, for example, $4\tau$, at the leading end position thereof, with the eight bits of data being provided immediately after this start bit. It should be appreciated that, in addition to the above PE or FM system for suppressing cross-talk interference, the latter interference may additionally be suppressed by providing different azimuth angles for the primary signal heads and the secondary signal head. In other words, this is accomplished by making the inclination angle of the head gap for the secondary signal head different than the inclination angle of the head gap for the primary signal heads.

Further, since the width of a conventional compact magnetic cassette tape is narrow, for example, approximately 3.8 mm, the width of secondary signal track 3 is extremely narrow. In such case, it is extremely difficult to maintain precise mechanical alignment of a reproducing head with respect to magnetic tape 1, because of variations in the engagement of the cassette with the cassette reel drive shafts and the cassette support section of the apparatus. This means that any misalignment of the secondary signal reproducing head will result in errors in the reproduced secondary signal, for example, due to cross-talk interference. It should be appreciated, therefore, that if the secondary signal recording track width and secondary signal reproducing track width are equal, there will likely be positional deviation of the reproducing head with respect to the narrow secondary signal track 3, resulting in a deterioration of the reproduced signal. This deterioration can effectively be prevented by setting the reproducing track width wider than the recording track width. In this manner, the recording track width $D_R$ of secondary signal track 3 which is recorded by secondary signal recording head 6, is made extremely narrow, for example, on the order of approximately 0.25 mm. On the other hand, the reproducing or playback track width $D_p$ of secondary signal reproducing head 7 is set wider than recording track width $D_R$, for example, on the order of approximately 0.35 mm, thereby eliminating the need for precise mechanical alignment of reproducing head 7.

Figure 6A:
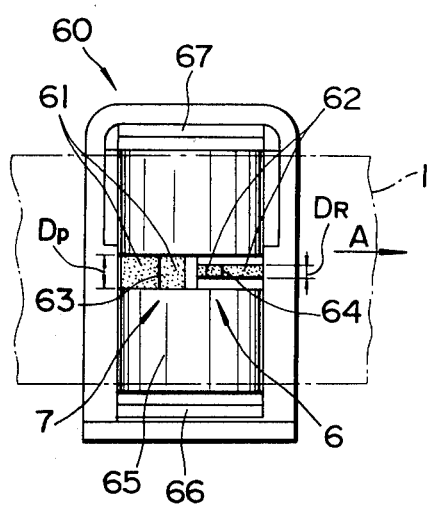
FIG. 6A is a front elevational view of a magnetic head assembly according to one embodiment of this invention for recording and reproducing secondary information signals in the single secondary signal track.
Figure 6B:
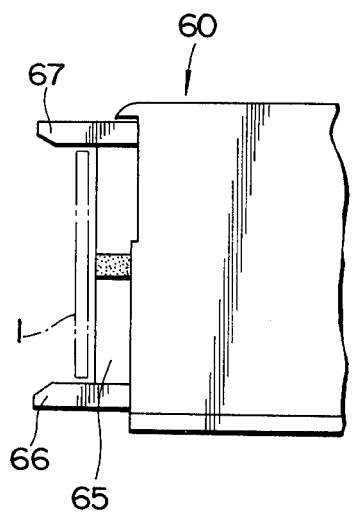
FIG. 6B is a partially broken-away side elevational view of the head assembly of FIG. 6A.

One embodiment of a secondary signal recording/reproducing head assembly 60 is shown in FIGS. 6A and 6B and includes a secondary signal magnetic recording head 6 and a secondary signal magnetic reproducing head 7 positioned in that order in the actual longitudinal running direction of magnetic tape 1, as indicated by arrow A in FIG. 6A. In this embodiment, secondary signal reproducing head 7 also functions as an erase head. As shown in FIG. 6A, magnetic heads 7 and 6 are comprised of head cores 61 and 62, respectively, having respective head gaps 63 and 64 with the gap dimensions in the widthwise direction of the magnetic tape being equal to approximately 0.35 mm and 0.25 mm, respectively. A magnetic shield member 65 is positioned in front of secondary signal head assembly 60, except at those portions where head 6 and 7 are exposed so as to prevent leakage of magnetic flux from heads 6 and 7 to main signal tracks 2a and 2b and thereby to prevent cross-talk interference. It should be appreciated that magnetic shield member 65 is adapted to contact magnetic tape 1 while the latter is moving in the longitudinal direction thereof during the recording and reproducing operations. Further, head assembly 60, as shown in FIGS. 6A and 6B, includes guide members 66 and 67 for guiding the lower and upper edges of magnetic tape 1, in the widthwise direction thereof, with respect to head assembly 60. In other words, guide members 66 and 67 project outwardly from head assembly 60 so as to contact the edges of magnetic tape 1, thereby regulating the widthwise position of the magnetic tape so that precise alignment of magnetic heads 6 and 7 with respect to secondary signal track 3 can be achieved.

Figure 7:
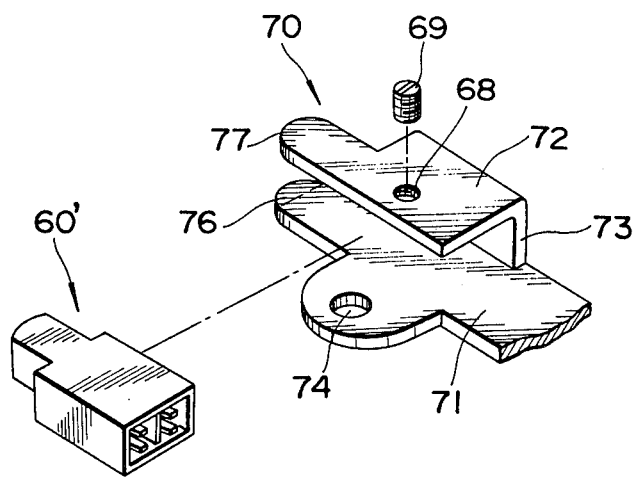
FIG. 7 is an exploded perspective view of a secondary signal magnetic head assembly according to another embodiment of this invention.

Although guide members 66 and 67 are assembled as part of secondary signal head assembly 60 in the embodiment of FIGS. 6A and 6B, the guide members may be separately secured to head assembly 60. For example, as shown in FIG. 7, guide members 76 and 77, which correspond to guide members 66 and 67 of FIGS. 6A and 6B, are formed as part of a head support device 70 used for mounting a secondary signal head assembly 60' on a tape recorder slide chassis or the like of the tape recording and reproducing apparatus. Tape guide members 76 and 77, in a similar manner to tape guide members 66 and 67, frictionally guide the edges of magnetic tape 1 in a direction parallel to the longitudinal tape running direction. In this manner, the position of the magnetic tape in the widthwise direction thereof with respect to head assembly 60' can be accurately controlled to provide precise head alignment.

Figure 8:
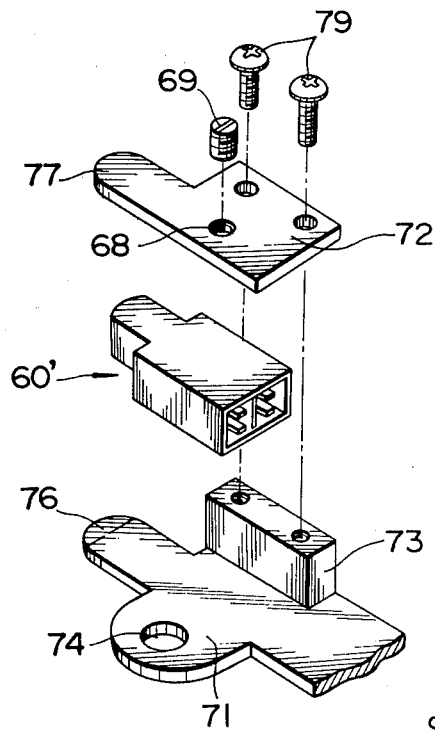
FIG. 8 is an exploded perspective view of a secondary signal magnetic head assembly according to another embodiment of this invention.

Head support device 70 also includes a base plate 71 having a screw receiving aperture 74 for securing device 70 to the slide chassis or the like. A top plate 72 extends parallel to base plate 71 and is connected thereto by a sidewall member 73. In this manner, secondary signal head assembly 60' is adapted to be clamped between base plate 71 and top plate 72 by a set screw 69 screw-threadedly received in an aperture 68 formed in top plate 72. However, it is to be appreciated that, although a set screw 69 has been illustrated, secondary signal head assembly 60' may be secured to device 70 by any other suitable means, for example, by means of an adhesive. When secondary signal head assembly 60' is positioned between base plate 71 and top plate 72, guide members 76 and 77 are formed to project therefrom, respectively, into contact with the magnetic tape. In this manner, guide members extend slightly in front of head assembly 60', in a similar manner as previously described and shown in regard to the embodiment of FIG. 6B, so that precise alignment between head assembly 60' and the magnetic tape is achieved. Further, although head support device 70 has been shown as an integral unit in the embodiment of FIG. 7, it is to be appreciated that head support device 70 may be constructed from separate elements, for example, as shown in FIG. 8. As shown therein, top plate 72 is removably secured by screws 79 to sidewall member 73.

Figure 9:
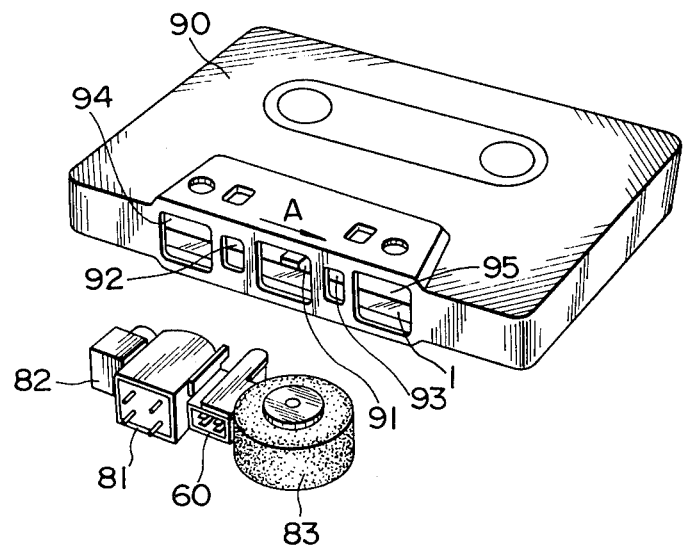
FIG. 9 is a schematic perspective view of a magnetic head assembly according to one embodiment of this invention, in an inoperative position with respect to a magnetic cassette tape.
Figure 10:
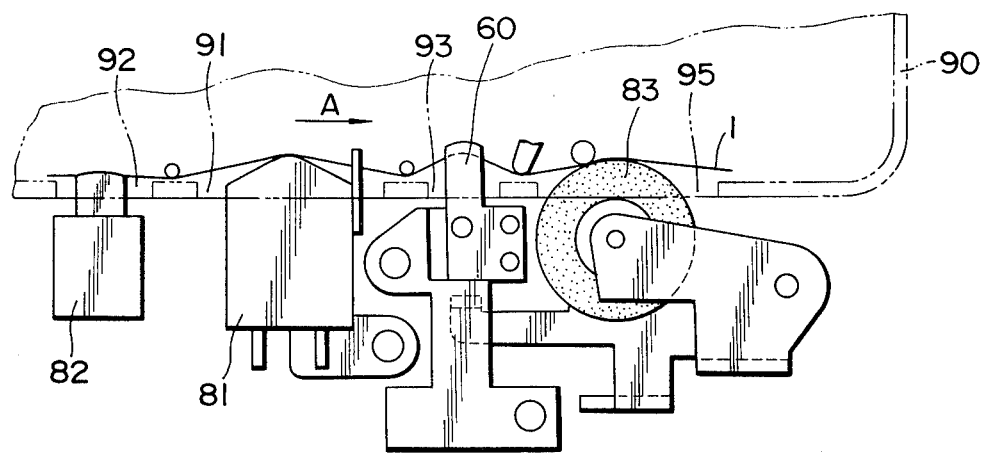
FIG. 10 is a schematic, partially broken-away, top plan view of the magnetic head assembly of FIG. 9 in an operative position with respect to the magnetic cassette tape.

It is to be appreciated that the positioning of the cassette and, more particularly, magnetic tape 1 therein, with respect to secondary signal head assembly 60 may be accomplished in various ways. For example, as shown in FIGS. 9 and 10, secondary signal head assembly 60 is positioned to one side of a primary signal head assembly 81, the latter functioning to record and reproduce audio signals from primary signal tracks 2a and 2b. As shown in FIGS. 9 and 10, the front edge of a compact audio cassette 90 is provided with various openings for accommodating the head assemblies and a tape drive mechanism. In particular, cassette 90 includes a centrally positioned window 91 through which primary signal head assembly 81 is adapted to extend for recording and reproducing audio signals from the tape. Smaller windows 92 and 93 are symmetrically provided on opposite sides of window 91 for accommodating an erase head 82 and secondary signal head assembly 60, respectively. In this manner, when magnetic tape 1 is running in the longitudinal direction of arrow A in FIG. 9, erase head 82 first contacts the tape to erase any signals recorded thereon, followed by primary signal head assembly 81 for recording and/or reproducing the audio signals from the tape and then followed by secondary signal head assembly 60 for recording and/or reproducing the secondary signals from the tape. Further, cassette 90 includes larger windows 94 and 95 adjacent smaller windows 92 and 93 and symmetrically arranged with respect to window 91. The larger windows 94 and 95 are adapted to receive a pinch roller 83 which cooperates with a capstan, as is well known in the art. In the embodiment of FIGS. 9 and 10, pinch roller 83 is positioned within window 95. However, when cassette 90 is turned over in the assembly, pinch roller 83 is positioned within window 94.

Figure 12:
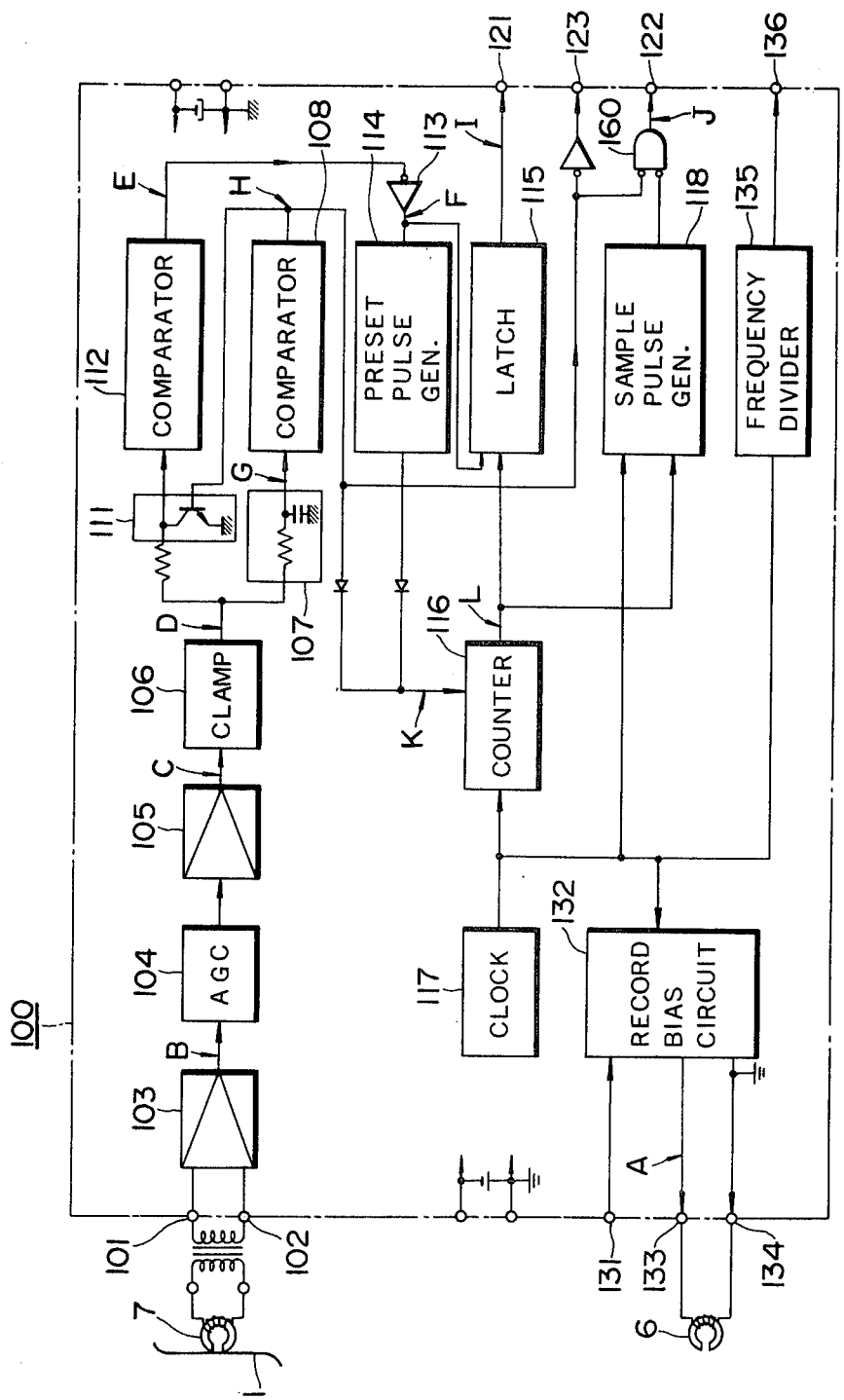
FIG. 12 is a block diagram of a secondary signal recording/reproducing circuit according to one embodiment of this invention.
Figure 13:
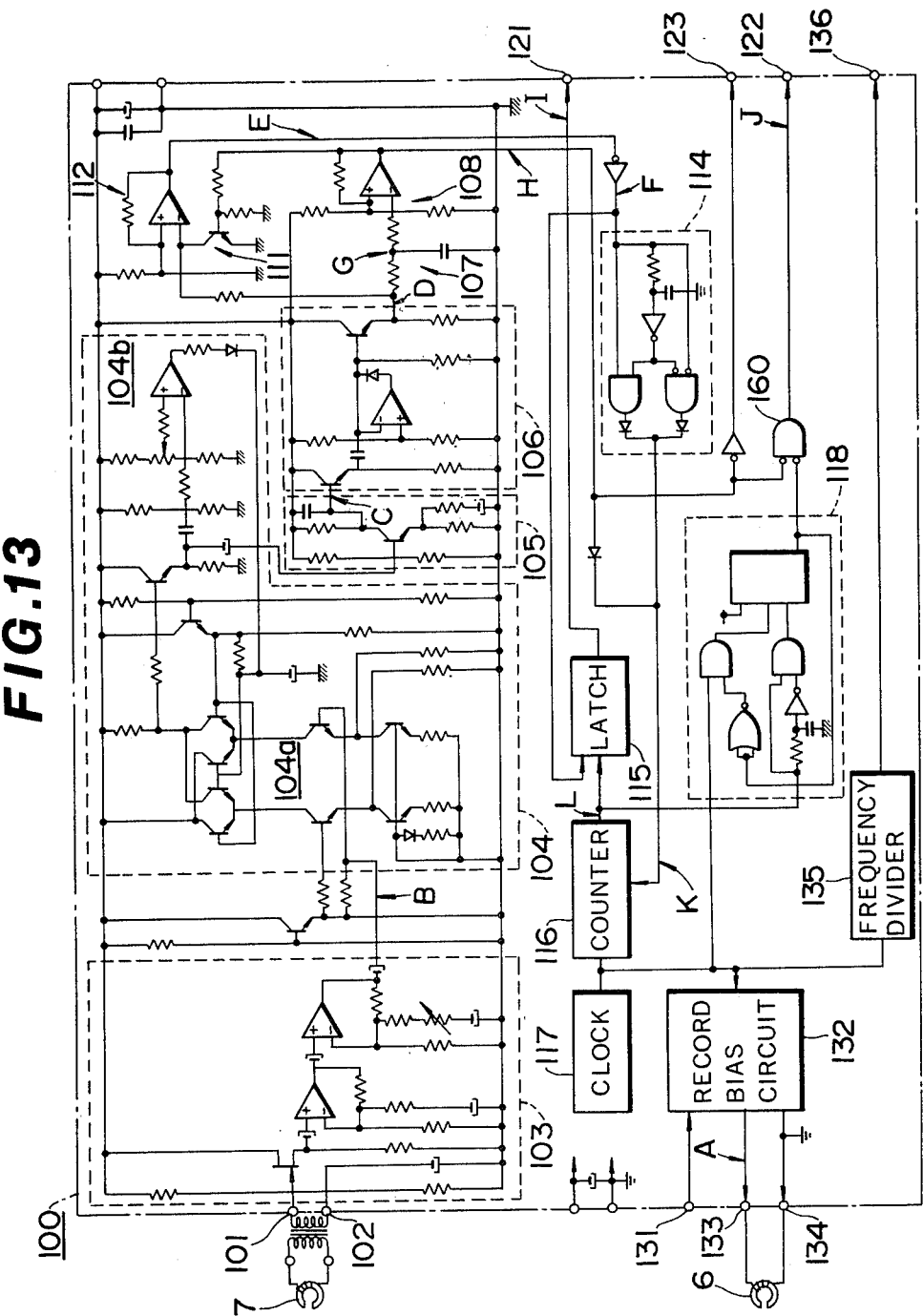
FIG. 13 is a detailed circuit-wiring and block diagram of the circuit of FIG. 12.
Figure 14:
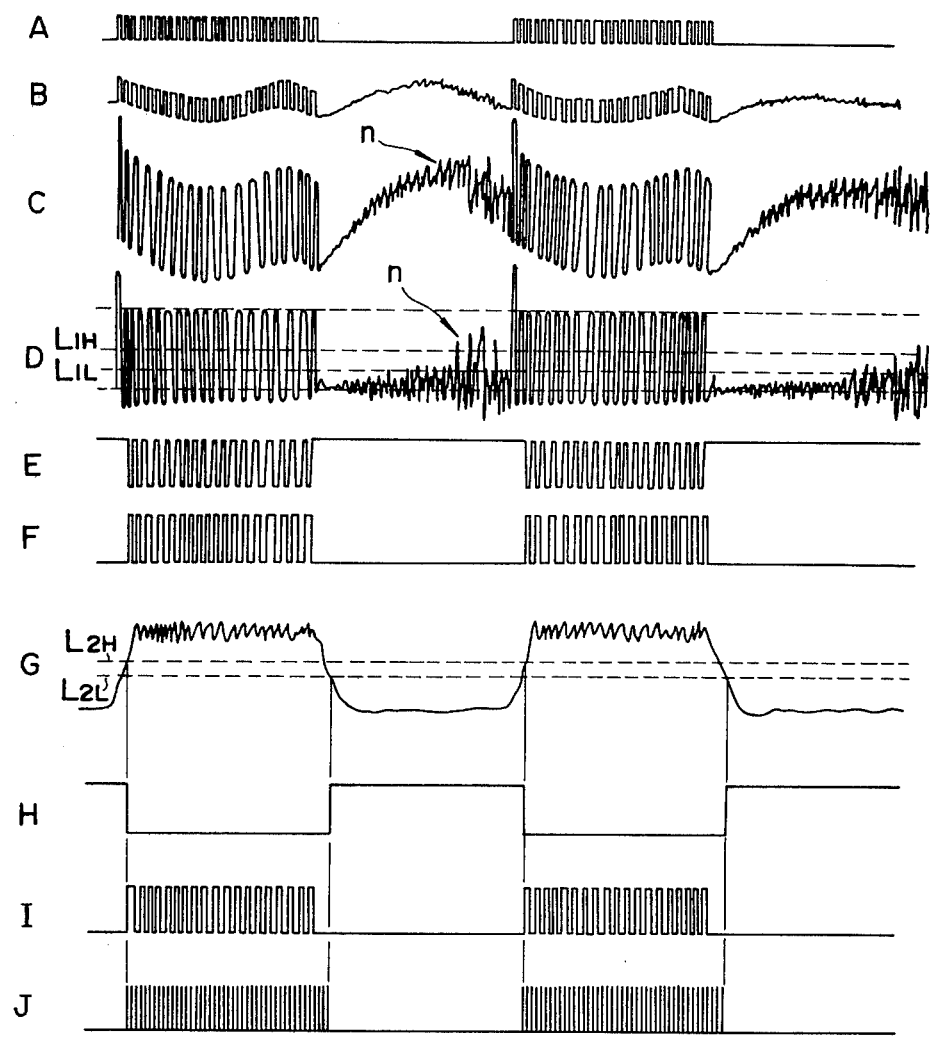
FIGS. 14A–14J are waveform diagrams used for explaining the operation of the circuit of FIGS. 12 and 13.

Referring now to FIG. 12, there is shown a block diagram of a circuit 100 for recording and reproducing the secondary signal with respect to secondary signal track 3. A more detailed circuit-wiring diagram is shown in FIG. 13 and the operation of such circuit will be described in relation to the waveform diagrams of FIGS. 14 and 15. In particular, the secondary signal, shown in FIG. 14A and in expanded form in FIG. 15A, is reproduced from magnetic tape 1 by secondary signal reproducing head 7 and is supplied through a transformer to reproduced signal input terminals 101 and 102 of recording/reproducing circuit 100. It should be appreciated that the reproduced waveform of FIG. 15A is of the phase encoded type previously described in regard to FIG. 11. The secondary signal A from input terminals 101 and 102 is amplified by a pre-amplifier 103 to obtain a reproduced output signal B, shown in FIGS. 14B and 15B. In particular, pre-amplifier 103 amplifies the secondary signal A supplied thereto so that the latter has a predetermined AGC input level. Pre-amplifier 103 has a high input impedance FET at its input, as shown in FIG. 13. The reproduced output signal B from pre-amplifier 103 is supplied through an AGC circuit 104 having a gain control characteristic so as to obtain a constant output level regardless of variations in the level of reproduced output signal B supplied thereto. The output signal from AGC circuit 104 is then supplied through an amplifier 105 to produce an output signal C, as shown in FIGS. 14C and 15C. As shown more particularly in FIG. 13, AGC circuit 104 includes an AGC amplifier section 104a and an AGC voltage generator section 104b. In this manner, a high frequency component of the signal supplied thereto is supplied by AGC voltage generator section 104b as an AGC control voltage to AGC amplifier section 104a for controlling the gain thereof. The reason for using the two sections is that if the direct current AGC voltage, which includes leakage components from the audio signal, 50-60 Hz alternating current signals and other various low frequency noise components superimposed on one another, as is apparent from FIGS. 14B and 14C, is supplied to AGC amplifier section 104a as a control voltage therefor, the high frequency components of the data are subject to amplitude modulation by the low frequency noise components, thereby producing the adverse effect of phase modulation.

The output signal C from amplifier 105 is supplied to a clamping circuit 106 which clamps the low frequency noise components, as shown in FIGS. 14D and 15D, so as to eliminate any adverse effects of such noise components on subsequent processing of the secondary signal. Although the output signal D of clamping circuit 106 includes high frequency noise components n in the non-signal section, as shown in FIG. 14D, such output signal is supplied to an integrating circuit 107 to obtain an integrated output signal G free from such high frequency noise components, as shown in FIG. 14G. The integrated output signal G from integrating circuit 107 is then supplied to a comparator circuit 108 for a level discrimination operation so as to obtain a detected output signal H, as shown in FIG. 14H, which is set at logic level "0" during the signal sections of the secondary signal and is at logic level "1" during the non-signal sections. Further, comparator circuit 108 has a hysteresis effect wherein the ON and OFF levels are indicated by $L_{2H}$ and $L_{2L}$, respectively, in FIG. 14G.

The output signal D from clamping circuit 106, as shown in FIG. 15D, is also supplied through a switching circuit 111 to a comparator circuit 112. Switching circuit 111 may be comprised of a transistor having its collector-emitter path connected between the output of clamping circuit 106 and ground and having its base supplied with the detected output signal H from comparator circuit 108. In other words, the output signal D from clamping circuit 106 is transmitted to comparator circuit 112 only when transistor 111 is inoperative, that is, when the detected output signal H from comparator circuit 108 has a logic "0" level so that the transmitted output signal D from clamping circuit 106 corresponds only to the signal sections of the secondary signal. During the noise or non-signal sections, the detected output signal H from comparator circuit 108 is at logic level "1" so as to turn ON the transistor of switching circuit 111 and thereby ground the output signal D from clamping circuit 106. Comparator circuit 112 also has a hysteresis effect, in the same manner as comparator circuit 108, such that the output signal E therefrom changes from a logic level "0" to a logic level "1" condition only when the level of the output signal D thereto falls below a first predetermined level $L_{1L}$ and changes from a logic level "1" condition to a logic level "0" condition only when the level of the input signal thereto rises above a second predetermined level $L_{1H}$, as shown in FIGS. 14D and 15D.

An inverting amplifier 113 performs a waveshaping operation on the level detected output signal E from comparator circuit 112 so as to produce an output data signal F, as shown in FIGS. 14F and 15F. This latter signal is supplied to a preset pulse generator circuit 114 to form a preset pulse signal, as shown in FIG. 15K, and is also supplied to a data latch circuit 115. The detected output signal H from comparator circuit 108 and preset pulse signal K, as shown in FIG. 15K, from preset pulse generator circuit 114, are supplied to a preset enable (PE) terminal of a preset counter 116. Clock pulses from a clock pulse generator 117 are also supplied to a clock input of counter 116. Counter 116, in turn, supplies a count pulse signal L (FIG. 15L) after each count of 2n clock pulses, corresponding to the reference period $\tau$ of the secondary signal. Further, each pulse of preset signal K from pulse generator circuit 114 functions to preset counter 116 to a preset value of n. In this manner, after each occurrence of a pulse from preset signal K, counter 116 is set to the preset value n and counts up to 2n clock pulses after a period equal to $\tau/2$, whereupon counter 116 produces a count pulse L. In the absence of a preset pulse K, counter 116 produces an output count pulse L for every count of 2n clock pulses, that is, after each reference period $\tau$. The count pulse signal L from counter 116 is supplied to the aforementioned data latch circuit 115 to latch the output data signal F from invertor amplifier 113 also supplied thereto. The reproduced data signal I from data latch circuit 115, as shown in FIGS. 14I and 15I, is then supplied to an output terminal 121.

Further, the count pulse signal L from preset counter 116 is supplied as a reset signal to a sampling pulse generator 118 and the clock pulses from clock pulse generator 117 are supplied to a clock input terminal of sampling pulse generator 118. The latter circuit is adapted to produce an output pulse having a pulse width corresponding to the period $\tau/2$ after each count of n clock pulses. The output signal from sampling pulse generator 118 is supplied to one input of a two-input NOR circuit 160 and other input of NOR circuit 160 is supplied with the detected output signal H from comparator circuit 108, whereby NOR circuit 160 produces a sampling pulse signal J, as shown in FIGS. 14J and 15J, and supplied the same to an output terminal 122. It should be appreciated that, when detected output signal H is at a logic level "1" condition during the noise or non-signal portions of the secondary signal, the sampling pulse signal J is always at logic level "0". However, during the signal portions of the secondary signal when detected output signal H is at a logic level "0" condition, NOR circuit 160 functions as an invertor to invert the output signal from sampling pulse generator 118. Further, as shown in FIG. 12, the detected output signal H from comparator circuit 108 is also supplied through an invertor to an output terminal 123.

The actual reproduced data can then be obtained as follows. The reproduced data signal I (FIG. 15I) from output terminal 121 is sampled in accordance with the sampling pulses J (FIG. 15J) at output terminal 122 to obtain an intermediate or quasi-data signal, as shown in FIG. 15J. The real or actual information signal may then be reproduced by checking the continuity of the level "1" and level "0" signals of the quasi-data signal, as shown in FIG. 15J. In other words, each single bit corresponds to a logic level "0" condition for the actual information while two continuous bits correspond to a logic level "1" condition for the actual visual information.

In regard to the recording of the secondary signal, the latter signal is produced by general digital processing techniques and a description thereof is omitted herein for the sake of brevity. The recording secondary signal is supplied through an input terminal 131 of secondary signal recording/reproducing circuit 100 to a recording bias circuit 132 therein which is also supplied with a reference clock signal from clock pulse generator 117. Accordingly, recording bias circuit 132 produces the secondary signal shown in FIGS. 14A and 15A and supplies the same through output terminals 133 and 134 to secondary signal recording head 6 for recording the secondary signal on the magnetic tape. For controlling the recording of the secondary signal on the magnetic tape, clock pulse generator 117 also supplies a clock signal to a frequency divider 135 which supplies a frequency-divided signal through an output terminal 136 to a recording signal synthesizing circuit or the like (not shown) for use during the recording operation.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method of recording a plurality of primary signals and a corresponding plurality of secondary signals in parallel tracks on a record medium, said method comprising the steps of:

recording a first primary signal in at least one first primary track;

recording a second primary signal in at least one second primary track which is parallel to said at least one first primary track; and alternately recording a first secondary signal corresponding to said first primary signal and a second secondary signal corresponding to said second primary signal in a single secondary track which is parallel to said at least one first primary track and said at least one second primary track and which is positioned between at least one first primary track and at least one second primary track, said step of alternately recording including recording said first secondary signal between a start signal and an end signal in each of a plurality of first information blocks in said secondary track and recording said second secondary signal between a start signal and an end signal in each of a plurality of second information blocks in said secondary track in an alternating relation with said first information blocks, the relative positions of said start signal and end signal in each of said first information block being reversed with respect to the positions of said start signal and end signal in each of said second information blocks.

2. The method according to claim 1; in which said plurality of primary signals include audio information signals and said plurality of secondary signals include visual information signals.

3. The method according to claim 1; in which said record medium is a magnetic tape and said single secondary track is positioned in the longitudinal direction of said tape and substantially in the center of said tape in the widthwise direction thereof.

4. The method according to claim 3; in which said at least one first primary track is positioned in the longitudinal direction of said tape and to one side of said single secondary track in the widthwise direction of said tape and said at least one second primary track is positioned in the longitudinal direction of said tape and to the other side of said single secondary track in the widthwise direction of said tape.

5. The method according to claim 4; in which said single secondary track is separated in the widthwise direction of said tape from each of said at least one first primary track and said at least one second primary track by a guard band.

6. The method according to claim 4; in which said at least one first primary track is comprised of a first channel track and a second channel track separated from said first channel track in the widthwise direction of said tape by a guard band, both of said first and second channel tracks extending in the longitudinal direction of said tape, and said at least one second primary track is comprised of a third channel track and a fourth channel track separated from the said third channel track in the widthwise direction of said tape by a guard band, both of said third and fourth channel tracks extending in the longitudinal direction of said tape.

7. The method according to claim 1; in which the start signal and end signal recorded in each of said first and second information blocks is recorded in a symmetrical digital form.

8. The method according to claim 1; in which said first and second secondary signals are recorded in phase encoded digital form and have frequencies in the range of 1 KHz to 4 KHz to reduce cross-talk interference between said secondary signals and said primary signals during reproduction thereof.

* * * * *